Patented Mar. 31, 1936

2,035,557

UNITED STATES PATENT OFFICE 2,035,557

HORMONE

Fritz Laquer, Wuppertal-Vohwinkel, and Hermann Weyland, Wuppertal-Elberfeld, Germany, assignors to Winthrop Chemical Company, Inc., New York, N. Y., a corporation of New York No Drawing. Original application June 25, 1928, Serial No. 288,282. Divided and this application April 20, 1932, Serial No. 606,528. In Germany August 17, 1927

6 Claims. (Cl. 167—74)

The present invention relates to a process of manufacturing a therapeutically active preparation containing an active principle displaying the physiological activity of the ovarial hormone, which process involves the separation of this hormone from an active principle displaying the physiological activity of the hormone of the anterior lobe of the hypophysis accompanying the ovarial hormone, said ovarial hormone being characterized by its direct action on the sexual organs even of castrated rodents causing rutting phenomena, whereas the characteristic action of the hormone of the anterior lobe of the hypophysis is to cause premature rutting phenomena when administered to uncastrated infantile rodents.

In accordance with the present invention a preparation containing an active principle displaying the physiological activity of the ovarial hormone may be obtained by extracting human or animal fluids containing the said active principle with a neutral organic liquid immiscible with water. Thereby the principle displaying the action of the ovarial hormone is extracted, whereas the principle displaying the action of the hormone of the anterior lobe of the hypophysis remains in the mother liquor. The latter hormone may be obtained from said mother liquor by precipitation by means of a large excess of a neutral organic liquid miscible with water, in accordance with the process described in our copending application Serial No. 288,282, filed June 25, 1928, now U. S. P. 1,910,298 of May 23, 1933. A precipitation of the hormone of the anterior lobe of the hypophysis by means of a neutral organic liquid miscible with water, when carried out before the ovarial hormone has been extracted from the original liquid, does not simultaneously carry down the ovarial hormone so that the extraction of the ovarial hormone by means of a neutral organic solvent immiscible with water may be effected also after precipitation of the hormone of the anterior lobe of the hypophysis. In the latter case the filtrate, obtained after removal of the precipitate containing the hormone of the anterior lobe of the hypophysis, has to be freed from the organic liquid used as precipitating agent prior to the extraction of the ovarial hormone by the neutral organic liquid immiscible with water.

Human or animal fluids to be used as starting materials are, for example, the urine of pregnant women or animals or aqueous extracts of certain organs containing the hormones. As neutral organic liquids immiscible with water and suitable for the extraction of the ovarial hormone may be mentioned, by way of example, ether or chloroform. The extracts of the ovarial hormone thus obtainable may be subjected to a purification, for example, by adsorbing the hormone to an adsorbing agent and subsequently dissolving out the hormone from the adsorbate by means of a neutral organic solvent; or the extract may be treated after evaporating the organic solvent with a saponifying agent, such as alkali, whereupon the hormone is extracted from the saponified solution by means of a neutral organic solvent. Another method for purifying the ovarial hormone is the precipitation with metal compounds, such as metallic salts and metallic colloids from which precipitates the hormone may be recovered by extraction with organic solvents. This hormone preparation is suitable for therapeutical purposes in cases of ovarial deficiency.

The invention is further illustrated by the following examples without being restricted thereto:

Example 1

100 liters of the urine of pregnant women, which is preserved advantageously by being kept weakly alkaline, or by the addition of alcohol in an amount of 20% by volume, or of cresol or the like, are concentrated to 10 liters at 40° C. in vacuo and to this concentrated liquid are added five times its quantity of common ethyl alcohol. A crude precipitate and a crude filtrate are obtained which are separated advantageously after standing for several days.

The crude filtrate is freed from alcohol, further concentrated and mixed with kieselguhr, until a crumbly mass is produced. The ovarial hormone is extracted from the latter with ether. The extract, dissolved in water, is filtered and further purified by prolonged heating with alcohol under a reflux condenser or saponifying with alkalies, after which the hormone is extracted from the saponified solution by means of ether or by precipitating the hormone by precipitants, such as for example, lead acetate and ammonia and extracting the precipitate with alcohol, ether and the like.

The standardizing of the hormone preparation is carried out by experiments on animals.

Example 2

100 liters of the fresh urine of pregnant women are evaporated at 40° C. in vacuo to 10 liters and precipitated with four times the quantity of acetone. A crude precipitate and a crude filtrate are obtained.

The crude filtrate, containing the ovarial hormone is freed from acetone and the remaining liquid is exhaustively extracted with chloroform. The extract after emulsifying in water and filtering, is further purified by careful treatment with appropriate metallic salts, metallic oxides or hydroxides or metallic colloids, for example, with neutral lead acetate solution or with dialyzed ferric hydroxide solution and the excess is removed again by means of hydrogen sulfide.

This is a division of our copending application Serial No. 288,282, filed June 25, 1928 now Patent No. 1,910,298.

We claim:—

1. A process for manufacturing a therapeutically active preparation, containing an active principle displaying the physiological activity of the ovarial hormone, from the urine of pregnant individuals, whereby simultaneously a separation of the said active principle from a substance displaying the physiological activity of the hormone of the anterior lobe of the hypophysis is effected, which process comprises concentrating the urine in vacuo at a temperature of up to 40° C., treating the concentrated urine first with a large excess of a water-soluble organic solvent, separating the precipitate thus obtained which contains the principle displaying the action of the hormone of the anterior lobe of the hypophysis, from the mother liquor by filtration, freeing the mother liquor from the water-soluble organic solvent and then extracting the mother liquor with a neutral organic liquid immiscible with water.

2. A process for manufacturing a therapeutically active preparation, containing an active principle displaying the physiological activity of the ovarial hormone, from the urine of pregnant women, whereby simultaneously a separation of the said active principle from a substance displaying the physiological activity of the hormone of the anterior lobe of the hypophysis is effected, which process comprises concentrating the urine in vacuo at a temperature of up to 40° C., treating the concentrated urine first with a large excess of a water-soluble organic solvent, separating the precipitate thus obtained which contains the principle displaying the action of the hormone of the anterior lobe of the hypophysis, from the mother liquor by filtration, freeing the mother liquor from the water-soluble organic solvent and then extracting the mother liquor with a neutral organic liquid immiscible with water.

3. A process for manufacturing a therapeutically active preparation, containing an active principle displaying the physiological activity of the ovarial hormone, from the urine of pregnant individuals, whereby simultaneously a separation of the said active principle from a substance displaying the physiological activity of the hormone of the anterior lobe of the hypophysis is effected, which process comprises concentrating the urine in vacuo at a temperature of up to 40° C., treating the concentrated urine first with a large excess of alcohol, separating the precipitate thus obtained which contains the principle displaying the action of the hormone of the anterior lobe of the hypophysis, from the mother liquor by filtration, freeing the mother liquor from the alcohol and then extracting the mother liquor with ether.

4. A process for manufacturing a therapeutically active preparation, containing an active principle displaying the physiological activity of the ovarial hormone, from the urine of pregnant women, whereby simultaneously a separation of the said active principle from a substance displaying the physiological activity of the hormone of the anterior lobe of the hypophysis is effected, which process comprises concentrating the urine in vacuo at a temperature of up to 40° C., treating the concentrated urine first with a large excess of alcohol, separating the precipitate thus obtained which contains the principle displaying the action of the hormone of the anterior lobe of the hypophysis, from the mother liquor by filtration, freeing the mother liquor from the alcohol and then extracting the mother liquor with ether.

5. A process for manufacturing a therapeutically active preparation containing an active principle displaying the physiological activity of the ovarial hormone, from the urine of pregnant individuals, whereby simultaneously a separation of the said active principle from a substance displaying the physiological activity of the hormone of the anterior lobe of the hypophysis is effected, which process comprises treating the urine first with a large excess of a water-soluble organic solvent, separating the precipitate thus obtained which contains the principle displaying the action of the hormone of the anterior lobe of the hypophysis, from the mother liquor by filtration, freeing the mother liquor from the water-soluble organic solvent and then extracting the mother liquor with a neutral organic liquid immiscible with water.

6. A process for manufacturing a therapeutically active preparation, containing an active principle displaying the physiological activity of the ovarial hormone, from the urine of pregnant individuals, whereby simultaneously a separation of the said active principle from a substance displaying the physiological activity of the hormone of the anterior lobe of the hypophysis is effected, which process comprises treating the urine first with a large excess of alcohol, separating the precipitate thus obtained which contains the principle displaying the action of the hormone of the anterior lobe of the hypophysis, from the mother liquor by filtration, freeing the mother liquor from the alcohol and then extracting the mother liquor with ether.

FRITZ LAQUER.
HERMANN WEYLAND.